United States Patent [19]

Nickl et al.

[11] 3,796,863

[45] Mar. 12, 1974

[54] OPTICAL SCANNING ARRANGEMENT AND ARTICLE USEFUL THEREWITH

[75] Inventors: Franklyn George Nickl, Northboro, Mass.; Joseph Francis Schanne, Cheltenham, Pa.

[73] Assignee: RCA Corporation, New York, N.Y.

[22] Filed: Jan. 19, 1972

[21] Appl. No.: 218,972

[30] Foreign Application Priority Data

Mar. 23, 1971 Great Britain .................... 7591/71

[52] U.S. Cl. 235/61.11 E, 235/61.12 N, 250/219 D

[51] Int. Cl...... G06k 7/10, G06k 19/06, G08c 9/06

[58] Field of Search235/61.11 D, 61.11 E, 61.12 N, 235/61.12 M; 340/146.3 K; 250/219

[56] References Cited

UNITED STATES PATENTS

| | | | |
|---|---|---|---|
| 3,636,317 | 1/1972 | Torrey | 235/61.12 N |
| 3,663,800 | 5/1972 | Myer et al. | 235/61.12 N |
| 3,623,028 | 11/1971 | Yoshida et al. | 235/61.11 E |
| 3,671,718 | 6/1972 | Genzel et al. | 235/61.12 N |
| 3,676,645 | 7/1972 | Fickenscher et al. | 235/61.11 E |

*Primary Examiner*—Daryl W. Cook
*Attorney, Agent, or Firm*—Smiley, Raymond E.; H. Christoffersen

[57] ABSTRACT

A machine readable binary encoded label having preamble, data and end sections comprising concentric annuli of two different reflectivities. The width of each annulus is an integral multiple N of some unit width. By limiting N to not greater than some given value, the data on the label, when read by optical scanning equipment which can detect transitions between reflectivities, provides the transition signals needed to resynchronize the scanning equipment clock circuitry.

3 Claims, 4 Drawing Figures

OPTICAL SCANNING ARRANGEMENT AND ARTICLE USEFUL THEREWITH

BACKGROUND OF THE INVENTION

Systems are known in which a binary encoded label attached to an article is employed either to identify the article or to provide some other information such as price, or in the case of mail, routing information (zip code). Optical scanning equipment is employed to read the label.

The labels may have a circular design so that orientation between the article to which the label is attached and the scanning equipment is not a problem. In some labels the information is coded as radial bars in two different colors such as black and white to represent binary digits "one" and "zero" respectively. An inner circumferential band of timing marks identifies the position of each data bit to the scanning equipment. The machining involved in making printing dies for bulk printed labels of the type described is very costly. In other systems the labels are printed with concentric rings to represent the information. Dies for making such labels may be easily machined but providing timing information on the label presents a problem. In the prior art the timing information is most typically achieved by providing special timing bands at spaced radii from the center which increases the diameter of the label by the total width of the timing bands. This may present a problem if the size of the label is important.

SUMMARY OF THE INVENTION

An article of manufacture to be read by optical scanning equipment comprises a label and a plurality of side-by-side information representing indicia, in two contrasting reflectivities representing the bits 1 and 0 respectively, on the label. The plurality of indicia represent binary coded characters. Each indicium has a width which is some integral multiple from one to N of a unit width U, where N is an integer greater than one and where the integral multiple in each case is equal to the number of binary digits represented by an indicium. N is not greater than the number of bits needed to represent one of said binary coded characters.

In an additional aspect of the invention, the labels are used with optical scanning equipment having a resetable clock pulse generator which is reset by a signal corresponding to transitions between the contrasting reflectivities of the information representing indicia.

DETAILED DESCRIPTION

Figure 1:
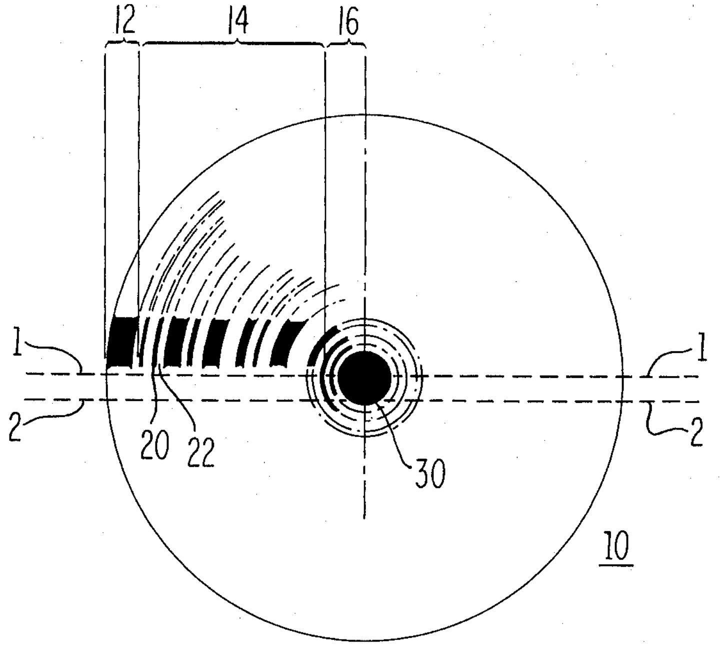
FIG. 1 is a pictorial representation of a typical designator label.

FIG. 1 shows a machine readable label 10 for use in article identification. The label may be on a separate sheet of paper which is glued or otherwise attached to the article to be identified or it may be printed directly on the article. Such a label, which is particularly suited for use in supermarkets, may contain coded information relating to any one or more of price, weight, size, manufacturers' code, brand name and description of the goods, as examples. The label may be circular in shape to permit optical scanning equipment such as that to be described in FIG. 3 to "read" the label along any diameter line, such as dashed line 1—1 of FIG. 1, without concern for orientation. The label contains a preamble section 12, a data section 14 and an end section 16.

The data section 14 may contain a plurality of annular bands of first and second reflectivities for representing the binary digits "one" and "zero." For example, a black band may represent one or more binary "ones" while a white band may represent one or more binary "zeroes." Any two colors may be chosen which have substantially differing reflectivities to the optical scanning equipment employed to read the labels. The data section contains a number of bands, each some integral multiple from 1 to N of a given unit width U, such as 0.05 inch, as measured along line 1—1 or any other diameter. In the example of FIG. 1, if the black annulus 20 is 0.05 inches wide, it represents one "one" bit; if it is 0.10 inches (i.e., two units) wide, it represents two adjacent "one" bits. The same holds for the white annuli such as 22 which represent "zero" bits.

The scanning equipment to be described scans a highly focused light beam across the label and includes means for sensing the resulting light reflected from the label, and converting that light to electrical signals. Since the rate of movement of the light spot across the label is known, the time between transitions from black to white or white to black is a measure of the width of a white or black annulus, and of the number of "one" or "zero" bits.

Figure 2:
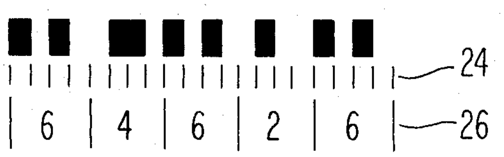
FIG. 2 is an enlarged section of the data portion of another label similar to the one of FIG. 1.

The data section may be subdivided into groups, each group consisting of four adjacent regions which represent one binary coded digit such as one decimal digit. There may be any number of such groups. For example, FIG. 2 shows a data section representing five groups of binary digits, each group coded in the way shown in Table 1 below, the five groups defining the five decimal digits of number 64626. The figure is illustrated with bars rather than annuli for convenience. Tic lines 24 and 26 denote respectively the boundaries between adjacent bit positions and decimal digit positions. It is possible that a data pattern could develop such that many adjacent unit widths could be one color. This would present no problem to the optical scanning equipment if the unit widths could be accurately maintained and the label were always a known fixed distance from the reading equipment.

In practice, neither of the above conditions is met. The printing on labels is not perfect and the label may be different distances from the light sensing means of the optical scanner. For example, in one case the label may be on the flat surface of an article immediately adjacent to the slot through which the light beam is scanned. In other cases the label may be varying distances from the slot such as when it is on the concave bottom of an aerosol can or on an irregularly shaped package of vegetables. It is therefore preferred that there be a clocking scheme built into the label. This is accomplished in accordance with one aspect of the present invention by limiting to a given value the maximum number of consecutive "one" or "zero" bits permitted in a decimal digit (that is, limiting the width of the black or white bands).

Table 1 below illustrates a code scheme in which there are no more than two adjacent "one" bits or two adjacent "zero" bits in any of the 10 decimal digits. Therefore, in two adjacent decimal digits there are never more than four adjacent "one" bits or four adjacent "zero" bits. Said another way, a transition from white to black or black to white will always occur after no more than four adjacent regions of unit width, the number of bits required to represent one decimal digit. It has been found that scanning equipment can be designed which can operate properly with all tolerance buildups expected in four adjacent regions of a given color. The equipment can be designed to reset or rephase each time a transition from white to black or black to white occurs.

TABLE 1

| | | | | | | | | | | |
|---|---|---|---|---|---|---|---|---|---|---|
| Decimal Number | | 0 | 1 | 2 | 3 | 4 | 5 | 6 | 7 | |
| | | | 188 | 9 | | | | | | |
| | Bit Position | | | | | | | | | |
| | $2^3$ | 0 | 0 | 0 | 0 | 0 | 1 | 1 | 1 | |
| | | | 181 | 1 | | | | | | |
| Binary | $2^2$ | 0 | 0 | 1 | 1 | 1 | 0 | 0 | 0 | |
| | | | 181 | 1 | | | | | | |
| Designation | $2^1$ | 1 | 1 | 0 | 0 | 1 | 0 | 1 | 1 | |
| | | | 180 | 0 | | | | | | |
| | $2^0$ | 0 | 1 | 0 | 1 | 0 | 1 | 0 | 1 | 0 |
| | | | 1 | | | | | | | |

While any code containing no more than $n$ consecutive "one" bits or "zero" bits ($n$ =2 in the example given) is satisfactory for use with the equipment of FIG. 1, the code set forth in Table 1 is particularly useful. It may be easily converted to a standard binary code by means of wired-in logic or by means of a computer program, either one based on the following two rules. If the $2^3$ bit is 0, subtract the binary equivalent of the decimal number 2 from the value given in Table 1 to get the standard binary value. If the $2^3$ bit is 1, subtract the binary equivalent of the decimal number 4.

Referring again to FIG. 1 it is seen that a preamble section 12 precedes and an end section 16 follows the data section. The preamble section consists of a large number, such as at least five adjacent regions of unit width of one reflectivity, separated from the data by a region of the other reflectivity of one unit width. FIG. 1 illustrates a black outer annulus and an adjacent white inner annulus but the opposite colors could be chosen and they would be equally satisfactory. An outer annulus of at least five units width is chosen so that the optical scanning equipment will not confuse it with data which can have no more than four adjacent units of the same reflectivity. The single unit inner band being of the opposite reflectance from the outer band causes a transition signal to be produced and this signal resynchronizes the clock pulses produced in the optical scanning equipment when the scanning light beam is at the beginning of the data section as discussed in greater detail below.

The end section 16 in FIG. 1 comprises (following the last data band) a white band, a black band, a white band all of single unit width and a center bull's-eye 30 of at least seven unit widths to the center (i.e., 14 unit widths across the entire bull's-eye). As with the preamble, the colors may be reversed. The center bull's-eye 30 must be a sufficient number of unit widths to ensure that the scanning equipment will scan through it even though the scan is offset from a diameter, for example along line 2—2, FIG. 1, while an article and its accompanying label are being moved past the scanning equipment in a direction transverse the scan direction. It has been found that a bull's-eye of at least seven units will work satisfactorily with the scanning equipment. The purpose of single unit band surrounding the inner bull's-eye of the opposite reflectivity is to ensure a transition when the optical scanning equipment scans to the bull's-eye or from the bull's-eye.

In the absence of the other two single unit bands an error in decoding can occur if a scanning trace is parallel to a true diameter, but just outside of the solid black center. For example, if the last information band is black and the trace goes through this band, but not through the white band preceding the bull's-eye, this last black information band may appear to the scanning equipment to be the bull's-eye. The fact that the trace did not go through the center could theoretically be detected by counting the number of data bits (unit widths). This means is not sufficient to detect errors, however, due to the fact that some information bands near the center may appear stretched sufficiently due to the off-center scanning trace that additional unit widths seem to be present. As a matter of fact, with some data combinations an off-the-center trace may look exactly like a trace through the center of a label coded for another number.

In order to prevent such erroneous decoding, an aspect of this invention provides that a fixed pattern of data bands be provided at the center of the label so that an error in timing due to an off-center trace may be detected and rejected. Since as mentioned above the region closest to the bull's-eye appears most distorted when any off-center scan is made, a single unit black band preceding the aforementioned single unit white band may be provided. The bit coding would now be, for example, reading from the outside to the center, a black band of five or more unit widths, a white band one unit wide, bands, white and black covering in total 20 units, a black band one unit wide, a white band one unit wide, and a black band some seven units wide to the center of the pattern. Then circuitry not shown may be adapted to look for an end section, following a data section consisting of the right number of bits, comprising a single unit black band followed by a single unit white band and the bull's-eye. If such a pattern is not detected indicating the scan did not occur close enough to the center of the label, the circuitry will reject the entire scan.

Analytical studies show that this geometry eliminates the possible error, however, optical effects have been shown to produce a signal indicating a wider black and a narrower white band than actually exists. Under these conditions, an erroneous read could still be made. To avoid this the end section 16 may be modified to a plurality of alternating single unit black and white annuli such as for example a single unit white, a single unit black, a single unit white band and then the black center.

Figure 3:
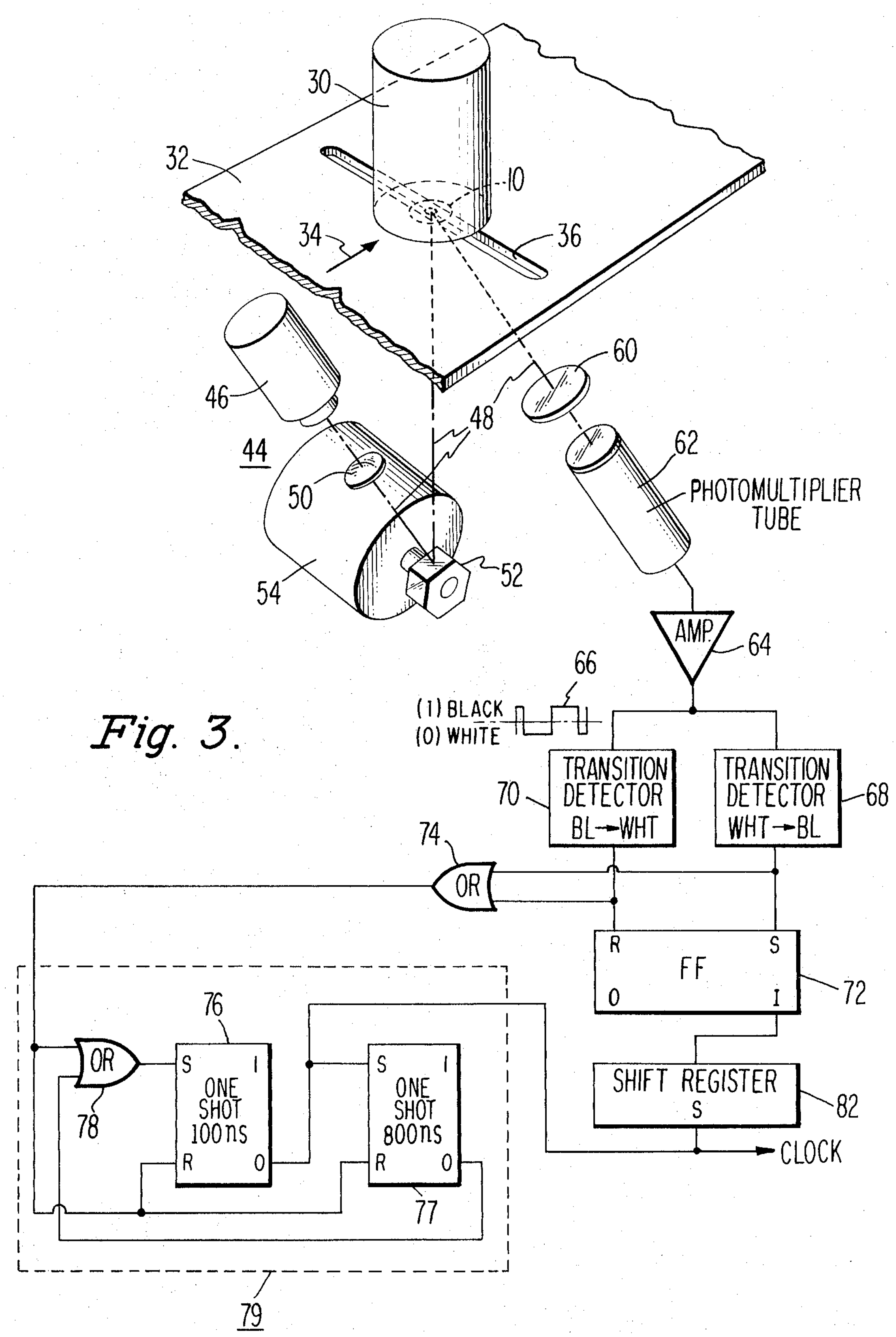
FIG. 3 is apparatus useful for optically reading the label of FIG. 1.

FIG. 3 illustrates a condensed version of an optical scanner which may be used for reading a label such as described above. A more detailed showing of certain features of the scanner may be found in Appl. Ser. No. 139,103 for "Article Identification Apparatus" filed by Joseph F. Schanne on Apr. 30, 1971 and assigned to the same assignee as the present application.

the absence of a signal from OR gate 74 a CLOCK signal will be produced every 900 ns. (100 ns. + 800 ns.). The combination of one shots 76 and 77 may be considered to be a resetable recirculating delay means which in the absence of a resynchronization pulse produces a CLOCK pulse every 900 ns.

A pulse from either of transition detectors 68 or 70 will via OR gates 74 and 78 reset one shot 77 (if set) and simultaneously attempt to set and reset one shot 76 which due to its nature will become set ensuring a CLOCK pulse 100 ns. later (unless a new pulse is produced at either of the transition detectors). Such a pulse appearing considerably before 900 ns. must be noise due to scanning the underside of an article 30 and passing over letters, numbers or other material in contrasting colors which cause the PMT to produce signals which operate the transition detectors. Therefore, register 82 initially may be storing signals which do not represent any intelligence of interest. Such noise, if present, is shifted along the shift register as data enters and is shifted out of the shift register, bit by bit, as the register fills with data. This noise is ignored by the circuits, not shown, to which the output signals of the register are applied.

The 900 ns. time between successive CLOCK pulses is chosen to be slightly longer than the time required by the light beam to scan through one unit width as it moves along a center line such as 1—1 of FIG. 1. The delay of 100 ns. between the detection of a transition and the production of a CLOCK pulse is to allow sufficient time for flip-flop 72 to change state and produce a stable voltage level at its output terminal.

As the first band of information on the label is five units of black, clock pulse circuit 79 recirculates the first CLOCK pulse five times. Thus, the first CLOCK pulse produced by the one shot 76 is followed by four other CLOCK pulses spaced fixed time intervals from one another during the time the light beam scans the black band of the preamble. These five CLOCK pulses shift the old data five places along register 82 and cause new data (five one's) to be shifted from flip-flop 72 into the register.

As mentioned earlier, under ideal circumstances the speed with which the beam scans label 10 could be accurately fixed and therefore the combined delay in one shots 76 and 77 could be accurately adjusted to produce a pulse each time that scan beam passes from one band to the next. But since due to printing problems the width of a band may vary and due to the variation in height of label 10 above plate 30 the time required to scan across a given band may vary, clock pulse circuit 79 must be periodically reset or resynchronized. This is accomplished for example when the scan beam moves from the outer black annulus to the adjacent singular white annulus. The black-to-white transition causes detector 70 to produce a pulse which resets flip-flop 72 and also resets one shot 77 (if set) and sets one shot 76 to produce a new CLOCK pulse 100 ns. later. The CLOCK pulse (the sixth) now resynchronized to the information on the label shifts the information in register 82 to transfer to the register the zero from the now reset flip-flop 72. After this synchronization pulse, a new one will occur at least once each four units of width and in most cases will occur in less than four units of width as should both be clear from Table 1.

It has been found that a practical scanning apparatus can be manufactured in which the variations in scan time across the bands will not vary sufficiently in the time required to scan four unit widths of a band to cause erroneous reading of data. As is described in detail in the aforementioned patent application, the unique combination of an at least five unit wide black band followed by a one unit wide white band may be used to condition a counter to count the data as it enters shift register 82. When the counter reaches the count indicating that all data has been scanned and shifted into shift register 82, other circuitry (not shown) may be employed to look for the unique end section code to ensure that the scan has indeed occurred across a diameter line of the label and not a line somewhat removed such as line 2—2 (FIG. 1).

Figure 4:
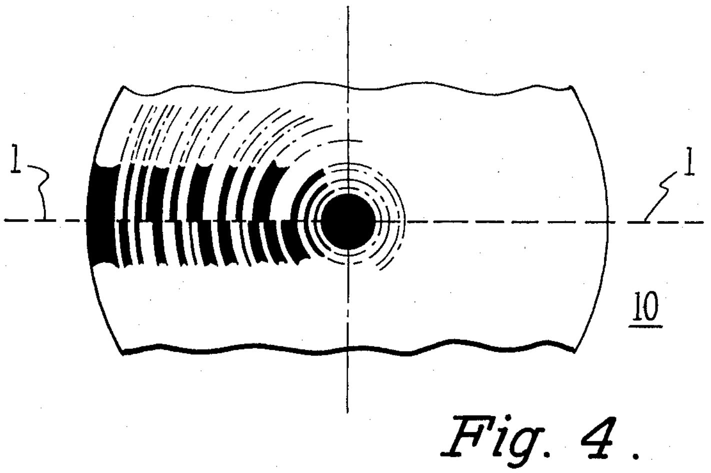
FIG. 4 is a broken away portion of a label similar to the one in FIG. 1 but with different data on opposite sides of a diameter line.

Two methods of scanning the data may be employed. In one method, the label is scanned from the outside to the center and then on across the opposite side. This method has the advantage of, in effect, scanning the label twice with one pass of the scanning beam 48. Data stored from the first half of the label in shift register 82 may be then compared with the data scanned across the second half of the label for agreement. A second method involves scanning from the outside to the center of the label or vice versa at least two times and then comparing the information read the first time which is stored in shift register 82 against data read on the second scan. When the latter method is used, the label may have a portion of the circle removed as being redundant. For example, everything beneath dashed lines 2—2 in FIG. 1 may be removed and still the label is readable. Finally as illustrated in FIG. 4 the label may have a different set of information on each half of a diameter line. Thus, for example, the label could contain one set of data above line 1—1 and a different set of data beneath line 1—1. This would not exactly double the amount of data which the label could contain as some type of code would have to indicate which way the label was being read, but it would increase substantially the amount of data which could be contained in a given label size. With such a scheme it is, of course, possible that a scan might occur right through the transition areas, that is, right along line 1—1. If this occurs, inaccurate read will be made, but comparison of two successive reads will reveal the inaccuracy which may then be corrected by rotating slightly the article bearing the label and reading it again.

While the label described is preferably circular to permit scanning without regard to orientation, if the article bearing the label can be oriented by an individual or by some mechanism (not shown) then some other type of code such as a bar code might still be employed but would advantageously contain not more than a given number of successive bits of one value to provide the self-clocking feature described.

What is claimed is:

1. The combination of:

a clock pulse generator for producing a train of clock pulses and responsive to each synchronization pulse it receives for synchronizing said train of clock pulses with said synchronization pulse;

a label having side-by-side indicia of different reflectivities representing binary coded characters each indicium representing a number from 1 to N of binary digits equal to the number 1 to N of integral multiples U, of unit size which define its width, where N is not greater than the number of bits defining one binary coded character;

The label 10 is affixed to the bottom of an article 30. The article is passed along an opaque plate 32 in the general direction of arrow 34. Such movement may be accomplished manually or by article moving equipment such as a belt or the like (not shown). Plate 32 is formed with a slot 36 therethrough extending in a direction generally transverse the direction in which article 30 is moved. The slot may be, for example one-fourth inch wide and 6 inches long, and it is through this slot that optical scanning takes place. The light source 46 for the optical scanning beam may be a laser or other light source adapted to emit a light beam 48 in the visible or near visible spectrum. As one specific example, source 46 may comprise a helium-neon laser that is pumped to produce a continuous laser beam of red monochromatic light of approximately 6,328 Angstrom wavelength.

The light produced by source 46 may be focused by a lens system, shown schematically at 50, onto a multi-faced mirror 52. The mirror 52 is mounted on a motor 54 which rotates the mirror at a substantially constant speed. The mirror is positioned to intercept the light beam 48 and project this beam through the slot 36 in plate 32. The rotation of mirror 52 caused a succession of light beam scans along any label 10 which is positioned over the slot. The number and size of the faces of mirror 52 are selected to produce only one scanning spot on the underside of an article 30 at any one time.

Reading station 44 also includes optical filter 60 in the path of the reflected beam and a photoresponsive pick-up device such as a photomultiplier tube 62 (PMT) beyond the filter positioned to receive diffuse light reflected from label 10 or from the bottom of any article 30 positioned over slot 36. Diffuse light rather than specular light is picked up because specular deflection tends to make a label 10 unreadable. The optical filter 60 is substantially matched to the monochromatical light emitted by light source 46 (if a monochromatic light source is used) and filters out ambient light having wavelengths not within the pass band of filter 60. PMT 62 converts the diffuse light in the reflected signal derived from scanning label 10 into an elecrical signal, the amplitude of which corresponds to the amount of light being reflected from the label at any instant in time. Of course more light is reflected from one color (white) than the other (black).

PMT 62 is coupled to an amplifier 64 to amplify the electrical signal. Amplifier 64 may produce waveform 66 as beam 48 scans across a label 10. That is, it may produce a relatively high voltage arbitrarily called a binary "one" when beam 48 is scanning across a black annulus and may produce a relatively low voltage arbitrarily called a binary "zero" when beam 48 is scanning across a white annulus.

Amplifier 64 is coupled to two transition detectors 68 and 70. Transition detector 68, which may be of any conventional type, produces a momentary pulse whenever a transition from white to black occurs. Transition detector 70, of similar construction, is designed to produce a momentary pulse when a transition from black to white occurs. The signals produced by transition detectors 68 and 70 are applied to the set (S) and reset (R) input terminals, respectively, of a flip-flop 72. The transition detectors are also coupled to OR gate 74 which produces a pulse whenever a transition from black to white or white to black occurs.

The output terminal of OR gate 74 is coupled to a clock signal producing circuit 79. In particular gate 74 is connected to the reset (R) terminals of resetable monostable multivibrators (one shots) 76 and 77 and to one input terminal of a second OR gate 78. One shots 76 and 77 are each of the type which is response to an input pulse at the set (S) terminal produce "one" and "zero" pulses respectively at the 1 and 0 terminals. They are reset by the lapse of time (100 nanoseconds (ns.) for one shot 76 and 800 ns. for one shot 77) or by a pulse at their R terminals. When reset they produce "zero" and "one" signals respectively at the 1 and 0 terminals. When a signal is received at both the S & R terminals of a one shot simultaneously it will be set. As is usual terminology in discussing binary circuitry, the term "one" may refer to one voltage level while the term "zero" refers to a second voltage level.

The output terminal of OR gate 78 is connected to the S input terminal of one shot 76. The O output terminal of one shot 76 labeled CLOCK is connected to the S input terminal of one shot 77 and to the shift input terminal (S) of a shift register 82. The 0 output terminal of one shot 77 is connected to the second input terminal of OR gate 78.

The 1 output terminal of flip-flop 72 is connected to the data input terminal of shift register 82. Shift register 82 is of conventional design which, in response to a CLOCK pulse, shifts the data within it along the shift register while admitting a new bit of information from flip-flop 72. Shift register 82 should be of sufficient capacity to hold the entire data section read from label 10.

The Schanne patent mentioned above describes additional circuits such as those necessary to ensure that a label 10 is being scanned across its center and that a label, not information on the container, to which the label is affixed, is being read. As these are not part of the present invention they are not discussed further here.

In the operation of the apparatus of FIG. 3, it will be assumed that an article 30, which may be a can, is positioned over slot 36 with its label 10 centered over the slot. As motor 54 rotates at a constant and known speed, a beam of light 48 is projected onto the bottom of the article and moves from the article to a diameter line 1—1 (FIG. 1) through the label. As the beam of light moves from article 30 (assumed to be light in color) onto the outer black annulus of label 10, a pulse is emitted from transition detector 68. This pulse causes flip-flop 72 to become set and, via OR gates 74 and 78 sets one shot 76. At the expiration of 100 ns. one shot 76 resets. The resulting output from the 0 output terminal, CLOCK, sets one shot 77 and causes all of the information contained in shift register 82 to be shifted one bit position and causes the new data bit appearing at the 1 output terminal of flip-flop 72 to be entered into the shift register. It is assumed that one shots 76 and 77 and register 82 respond to the leading edge of a pulse going from the "zero" state to the "one" state. If this is not so, an appropriate circuit (not shown) may be added to the 0 output of one shot 76 to produce a momentary pulse when that terminal changes from the "zero" state to the "one" state.

At the expiration of 800 ns. one shot 77 becomes reset. The resulting output from the 0 terminal via OR gate 78 again sets one shot 76 which 100 ns. later produces a CLOCK signal as previously described. Thus in means for scanning the indicia on said label for deriving from each transition from an indicium of one reflectivity to an indicium of another reflectivity a synchronization pulse; and means for applying said pulses to said clock pulse generator.

2. The combination of:

a clock pulse generator for producing a train of clock pulses and responsive to each synchronization pulse it receives for synchronizing said train of clock pulses with said synchronization pulse;

a label having concentric information representing indicia for representing binary coded characters in two contrasting reflectivities representing the bits 1 and 0, respectively, each indicium having a width which is some integral multiple from 1 to N times a unit width U, where N is an integer greater than 1, where said integral multiple, in each case, is equal to the number of binary digits represented by an indicium, and where NU is a width not greater than that needed to represent a binary coded character;

means for scanning the indicia on said label for deriving from each transition from an indicium of one reflectivity to an indicium of another reflectivity a synchronization pulse; and means for applying said pulses to said clock pulse generator.

3. The combination of claim 2, where N is an integer not greater than 4.

* * * * *

UNITED STATES PATENT OFFICE

CERTIFICATE OF CORRECTION

Patent No. 3,796,863 Dated March 12, 1974

Inventor(s) Franklyn George Nickl and Joseph Francis Schanne

It is certified that error appears in the above-identified patent and that said Letters Patent are hereby corrected as shown below:

Table 1, as illustrated in patent, Col. 3, lines 18-28, should be:

Table 1

| | Bit Position | 0 | 1 | 2 | 3 | 4 | 5 | 6 | 7 | 8 | 9 |
|---|---|---|---|---|---|---|---|---|---|---|---|
| Decimal Number | | 0 | 1 | 2 | 3 | 4 | 5 | 6 | 7 | 8 | 9 |
| Binary Designation | $2^3$ | 0 | 0 | 0 | 0 | 0 | 1 | 1 | 1 | 1 | 1 |
| | $2^2$ | 0 | 0 | 1 | 1 | 1 | 0 | 0 | 0 | 1 | 1 |
| | $2^1$ | 1 | 1 | 0 | 0 | 1 | 0 | 1 | 1 | 0 | 0 |
| | $2^0$ | 0 | 1 | 0 | 1 | 0 | 1 | 0 | 1 | 0 | 1 |

Column 6, line 6 - "is" should be --in--.

Signed and sealed this 8th day of October 1974.

(SEAL)
Attest:

McCOY M. GIBSON JR.
Attesting Officer

C. MARSHALL DANN
Commissioner of Patents